United States Patent [19]
Anderson

[11] Patent Number: 5,062,387
[45] Date of Patent: Nov. 5, 1991

[54] ANIMAL WASTE COLLECTION PIT FLUSHING APPARATUS AND METHOD

[76] Inventor: Ricky Anderson, Highway 18 West, Box 1816, Mason City, Iowa 50401

[21] Appl. No.: 594,016

[22] Filed: Oct. 9, 1990

[51] Int. Cl.$^5$ .............................................. A01K 1/01
[52] U.S. Cl. ........................................ 119/28; 119/16
[58] Field of Search ..................... 119/27, 28, 16, 20

[56] References Cited
U.S. PATENT DOCUMENTS

| | | | |
|---|---|---|---|
| 3,137,270 | 6/1964 | Rigterink et al. | 119/28 |
| 3,530,831 | 9/1970 | Conover | 119/28 |
| 3,982,499 | 9/1976 | Frankl | 119/28 |
| 4,121,539 | 10/1978 | Moore | 119/28 |
| 4,175,515 | 11/1979 | Bradley | 119/16 |
| 4,913,095 | 4/1990 | Morrow et al. | 119/16 |

*Primary Examiner*—Paul J. Hirsch
*Attorney, Agent, or Firm*—Kent A. Herink; Brian J. Laurenzo

[57] ABSTRACT

A method and apparatus for cleaning a waste collection pit of an animal housing facility. A storage tank or reservoir for water to be used in the cleaning operation is suspended inside the upper confines of the housing facility above the living quarters of the animals. Water from the storage tank is directed through a vertical down tube to a water distributor associated with each waste collection pit. Interposed in the vertical down tube for controlling the flow of water is a slide gate valve of a design to travel from a fully closed to fully open position within a short time interval. The storage tank provides a pressure head of water for the efficient flushing of wastes from the collection pit during a flushing operation. Water used in a flushing operation is collected either in a storage lagoon for recycling or for transport to a remote treatment or application location.

3 Claims, 4 Drawing Sheets

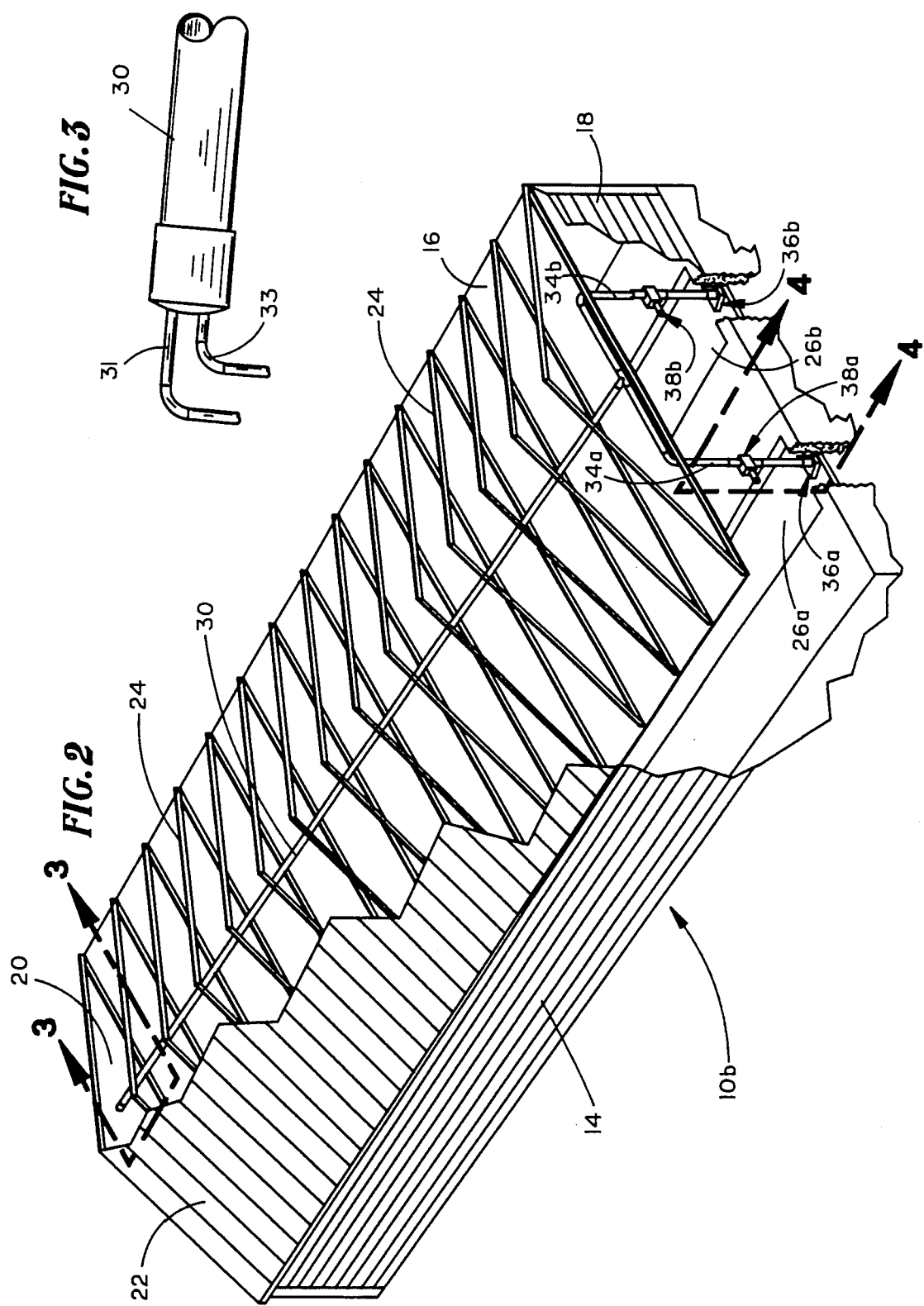

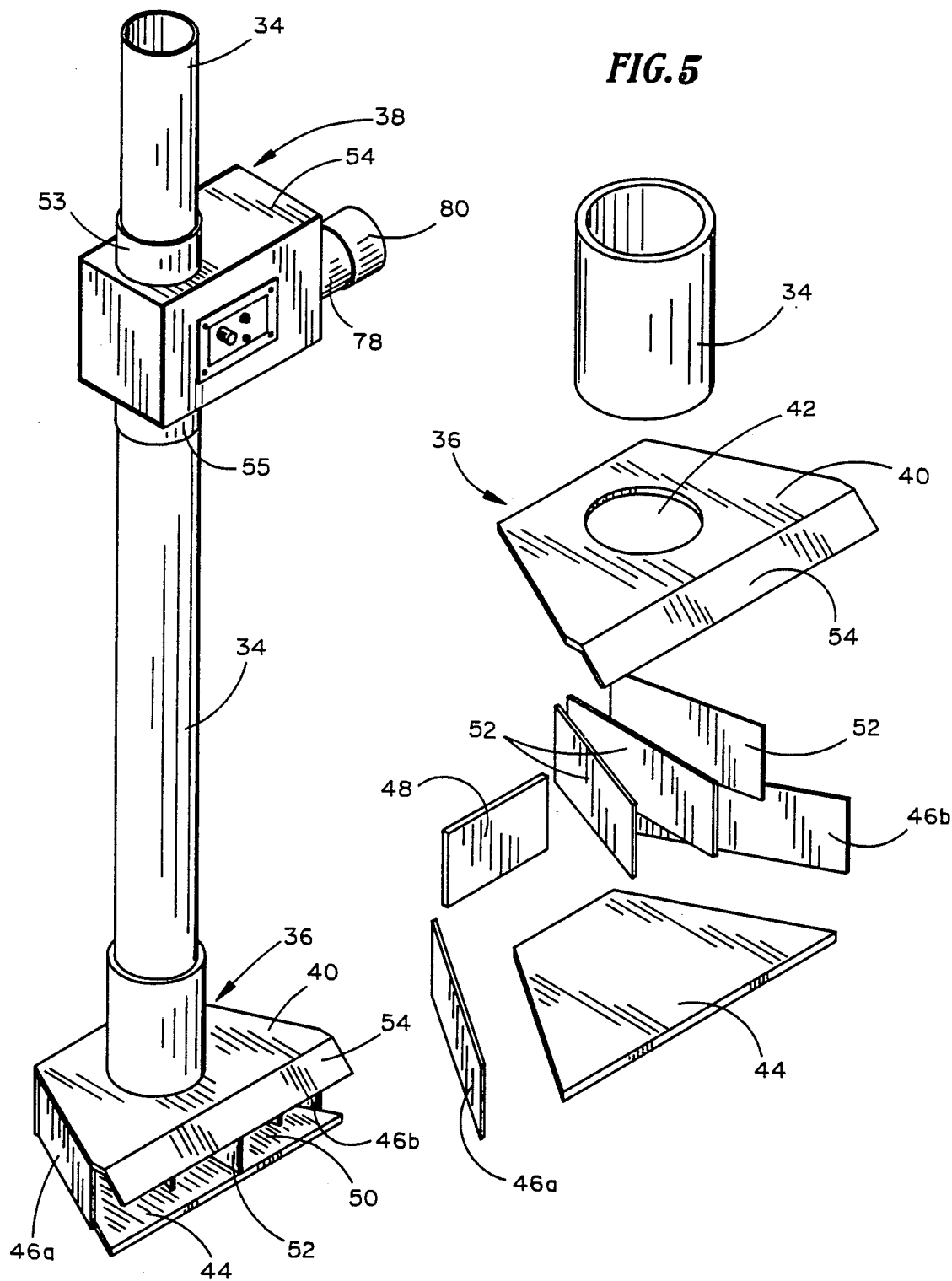

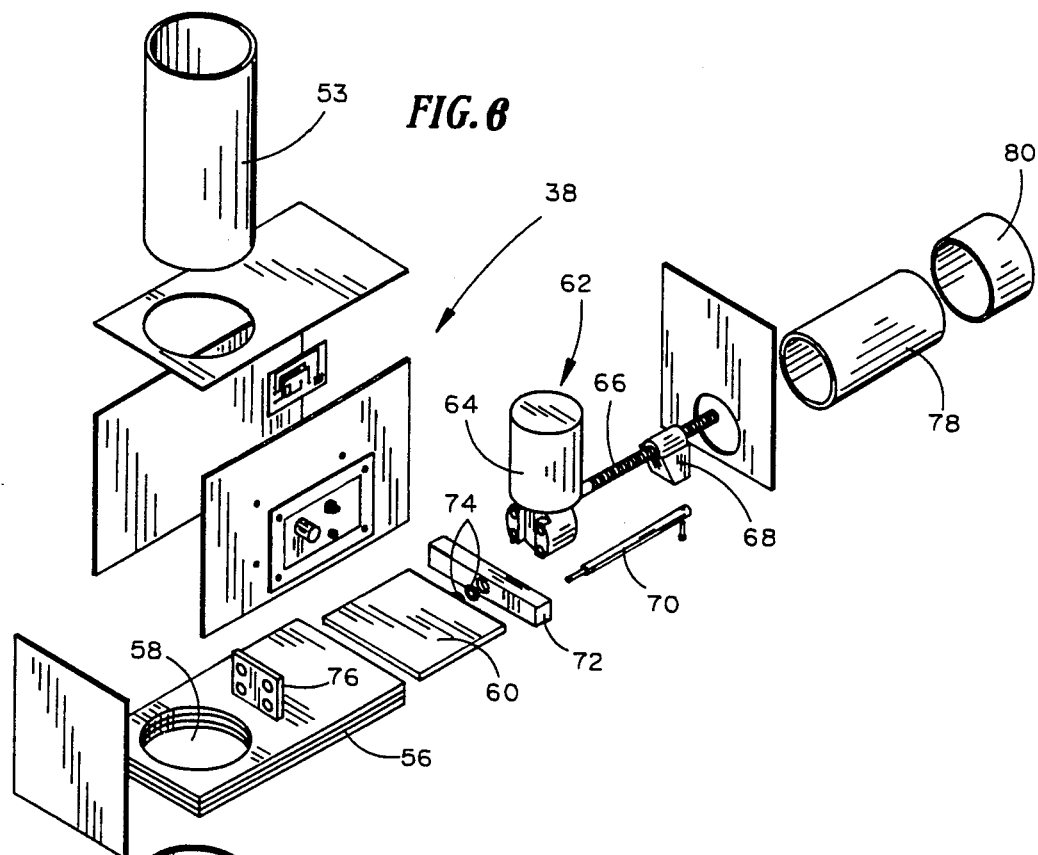
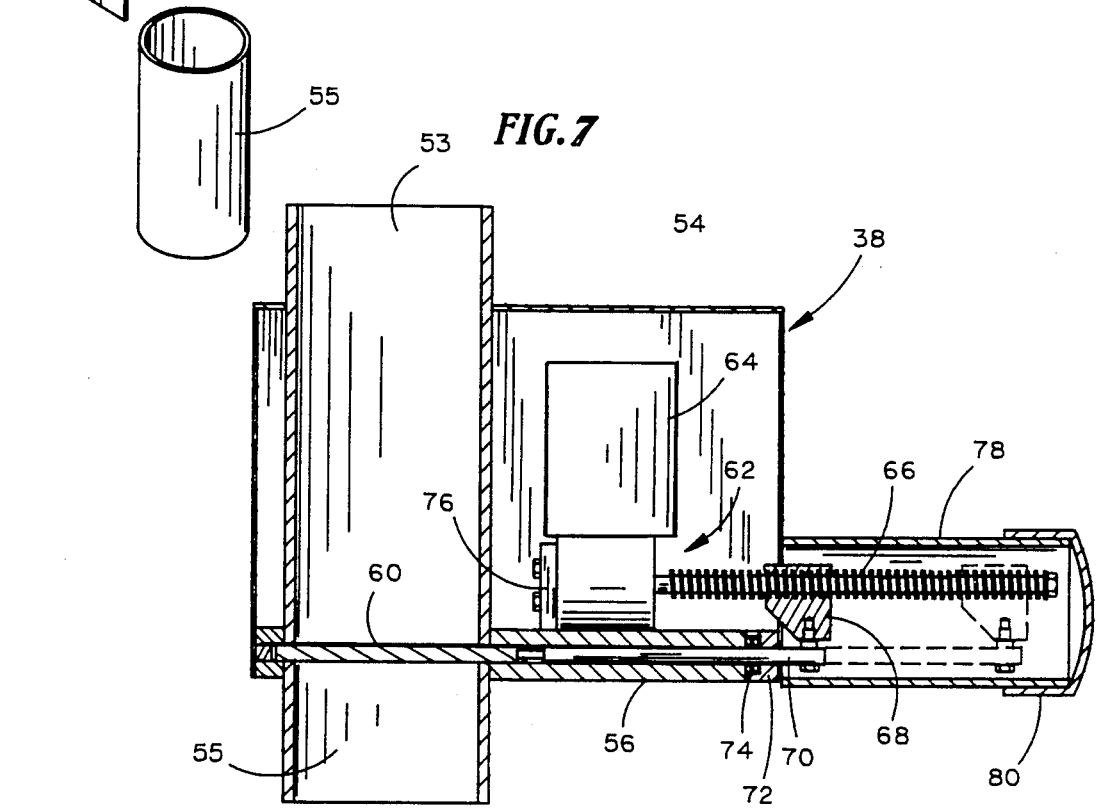

ANIMAL WASTE COLLECTION PIT FLUSHING APPARATUS AND METHOD

BACKGROUND OF THE INVENTION

This invention relates to the flushing of animal waste collection pits and, more particularly, to an apparatus contained inside an animal housing facility for periodically flushing a waste collection pit.

In animal confinement facilities it is common to have the floor which supports the animals suspended above a waste collection pit. Excreted waste from the animals passes through gratings or other perforations in the suspended floor and falls into the waste collection pit. In one design of pit, the pit is relatively deep and the wastes are allowed to collect over an extended period of time. To clean the pit, the wastes, which are typically fairly liquid in a deep pit of this type, are pumped out of the collection pit to a treatment lagoon or for transport to a remote treatment or application site.

More common are relatively shallow waste collection pits wherein the waste is allowed to collect only for a relatively short period of time between cleanings or flushings. These shallow pits are constructed with a slope for drainage. Water is introduced into the high end of the collection pit and is intended to carry the waste with it as it drains to the low end of the pit.

A large volume of water is generally needed to flush the waste from the pit. The cost of such water, its treatment, and the need for water conservation and to limit pollution put severe restrictions of the volume of water that can efficiently be used in such systems. It is, accordingly, desirable to limit the volume of water used in a flushing operation. Water will be conserved also if it can be recycled and used in multiple flushing operations. In cold weather, it is necessary to keep the flushing water from freezing if it is stored outside of the animal housing facility between flushing operations.

SUMMARY OF THE INVENTION

The invention consists of an apparatus and method for flushing a waste collection pit of an animal housing facility. A water storage tank or reservoir is located inside the housing facility supported above the living quarters of the animals. The storage tank drains downwardly through one or more vertical down tubes, each of which terminates at a water distributor for directing the flow of water from the storage tank across one end of the waste collection pit. A sliding gate valve is interposed in the down tube for controlling the flow of water from the storage tank. The gate valve is programmable to permit the selection of appropriate flushing intervals. When open, the gate valve does not impede the flow of water through the down tube so that the full pressure head of the storage tank is applied at the water distributor to clean efficiently waste from the collection pit with a limited volume of water.

An object of the invention is to provide a method apparatus for automatically flushing a waste collection pit at predetermined intervals.

Another object of the invention is to efficiently clean or flush animal waste collection pits with a relatively small volume of water at relatively high pressures without relying on a high pressure pump for the delivery of water during a flushing operation.

A further object of the invention is to provide a flushing apparatus enclosed within the animal housing facility so that freezing of the water is not a concern.

Still another object of the invention is the use of either fresh or recycled water in a flushing operation.

Yet another object is to provide a system for flushing a waste collection pit that is easily adaptable to a wide variety of animal housing facilities and is inexpensive to install and operate.

BRIEF DESCRIPTION OF THE DRAWINGS

FIG. 2 is a perspective view of a single housing facility with parts broken away to show the flushing apparatus;

FIG. 3 is an enlarged detail view of an end of the storage tank taken along lines 3—3 of FIG. 2;

FIG. 4 is a perspective view of a down tube, a water distributor and a gate valve taken along line 4—4 of FIG. 3;

FIG. 5 is an exploded perspective view of a water distributor;

FIG. 6 is an exploded perspective view of the gate valve; and

FIG. 7 is a cross-sectional view of the gate valve.

DETAILED DESCRIPTION OF A PREFERRED EMBODIMENT

Figure 1:
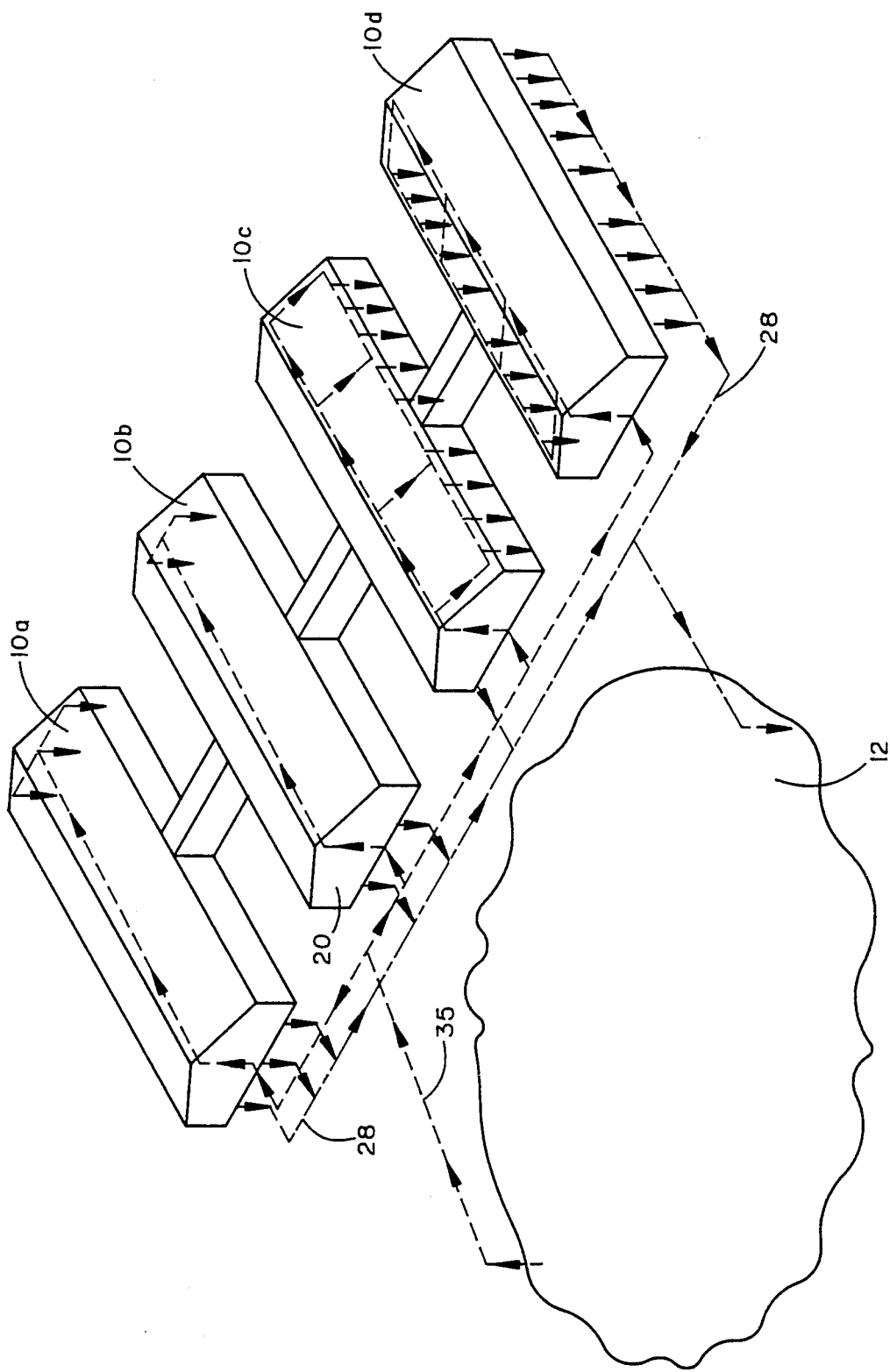
FIG. 1 is a perspective schematic view of a plurality of animal housing facilities in which the present invention is employed and a waste lagoon adjacent the facilities with arrows showing the flow of water for flushing of the waste collection pits.

Referred to FIG. 1, there is illustrated a plurality of animal housing facilities 10a-d in which have been installed the apparatus of the present invention for flushing one or more waste collection pits of the housing facilities 10a-d. The arrows in FIG. 1 depict the flow of water in the flushing apparatus and between a storage and treatment lagoon 12.

The housing facility 10b is illustrated on an enlarged scale in FIG. 2. In the preferred embodiment, the housing facility 10b is a frame building including side walls 14 and 16, end walls 18 and 20, and roof 22 which is supported on a plurality of rafters 24. The housing facility 10b has a pair of waste collection pits 26a and 26b extended longitudinally of the housing facility on either side of the center line thereof.

Animals housed inside the facilities are supported on floors (not shown) which ar suspended above the waste collection pits 26 in the usual manner. The floors have gratings, slots or other types of perforations that allow wastes eliminated by the animals to fall through the floor and into the waste collection pits 26. The waste collection pits 26 slope from the one end 18 of the animal housing facility 10b to the other end 20, typically having a pitch of about one and one-half percent. As illustrated in FIG. 1, the downstream or lower ends of the collection pits drain into a drainage system 28 which leads to the treatment lagoon 12.

The waste collection pits 26 may be of diverse design. For example, in the housing facility 10a, there are three longitudinal waste collection pits; in the waste collection facility 10c-d, a larger number of waste collection pits are arranged transversely of the housing facility. Also in the housing facilities 10c and 10d, the waste collection pits slope from one side of the building to the other where they drain into the drainage system 28.

The apparatus of the present invention includes a tubular storage reservoir or tank 30 extended longitudinally of the housing facility 10b and located generally in the rafters 24 above the living quarters of the animals inside the facility 10b (FIG. 2). In the preferred embodiment, the storage tank 30 is constructed of PVC sewer pipe and slopes from a high point located adjacent the end 20 of the housing facility 10b downwardly to a low point at the end 18. A slope of one degree or greater is preferred to facilitate rapid drainage of the storage tank 30 during a flushing operation, and the storage tank 30 is typically sloped to the greatest angle possible given the physical constraints of each particular installation. The system has been found to function satisfactorily even if the storage tank is horizontal.

Either fresh or recycled water may be used in the storage tank 30. In the preferred embodiment, two inlet tubes 31 and 33 (FIG. 3) lead into the storage tank 30 so that either fresh water or recycled water may be used. In the system as illustrated in FIG. 1, recycled water from the storage lagoon 12 may be fed to the storage tanks 30 through an intake distribution tube 35. Alternatively, fresh water may be introduced into the storage tank 30.

The storage tank 30 communicates at its lower end with an horizontal distribution tube 32 at the end 18 of the building. The distribution tube 32 distributes water from the storage tank 30 to a pair of vertical down tubes 34a and 34b associated, respectively, with the waste collection pits 26a and 26b. The down tubes 34a and 34b each lead to a water distributor or distributor box 36a and 36b, respectively, located adjacent the floor of the corresponding waste collection pit 26 at the high end thereof. A sliding gate valve 38a and 38b is interposed in a corresponding one of the down tubes 34a and 34b for controlling the flow of water from the storage tank 30 to the distributors 36.

As illustrated in FIG. 4, the down tube 34 is also constructed of PVC sewer pipe and terminates at the water distributor 36. Water flowing from the down tube 34 will enter the water distributor 36 and be distributed in a generally fan-shaped pattern. The water distributor 36 includes a top plate 40 which has an aperture 42 of the same size as the down tube 34 (FIGS. 4 and 5). The water distributor 36 also includes a lower plate 44 of a generally trapezoidal shape having closed side portions 46a and 46b and rear wall 48. Water entering the distributor 36 through the aperture 42 of the top plate 40 will flow out the open forward side 50 (FIG. 4) and is distributed into the fan-shape by the side walls 46a and 46b and a plurality of innerbaffles 52. The top plate 40 includes a downwardly sloping forward leading edge 54 which helps to direct water leaving the distributor 36 downwardly towards the floor of the waste collection pit 26.

The structure of the sliding gate valve 38 is best illustrated in FIGS. 6 and 7, and includes a box shaped enclosure 54 attached to the down tube 34 by sleeves 55 and 53. A stationary valve base plate 56 forms the bottom of the box enclosure 54 and has an aperture 58 in which is received the sleeves 55 and 53. A sliding gate 60 is received for relative sliding movement inside the valve base plate 56 between an open position wherein it does not extend inside the aperture 58 and a closed position wherein it fully occludes the aperture 58 to seal off the down tube 34 (FIG. 7).

The sliding gate 60 is moved by a linear actuator 62 housed inside the box enclosure 54. The linear actuator 62 includes a motor 64 which rotates a threaded shaft 66 extended laterally of the down tube 34 in the direction of travel of the sliding gate 60. A threaded block 68 is received about the threaded shaft 66 for reciprocating movement thereon by operation of the motor 64 of the linear actuator 62. A connecting rod 70 is bolted at its proximal end to the block 68 and at its distal end to the sliding gate 60. The connecting rod 70 extends through a top block 72 which receives a pair of seals 74 and is attached to the valve base plate 56. The top block 72 and seal 74 serve to prevent water which may be present in the valve base plate 56 from leaking around the connecting rod 70 and into the mechanical parts of the linear actuator 62. A mounting plate 76 is secured to the valve base 56 and is bolted to the linear actuator 62 to fix it relative to the valve base plate 56. Because the threaded shaft 66 extends outwardly of the box enclosure 54, a section of PVC pipe 78 and an end cap 80 surround the shaft 66 and reciprocating block 68 to protect also the mechanical parts of the linear actuator 62 from atmospheric environmental conditions which may be adverse inside the housing facility.

In FIG. 7, the closed position of the sliding gate valve 38 is illustrated in solid line in and the open position thereof is illustrated in broken line. In the closed position, the sliding gate 60 fully occludes the down tube 34 so that no water can pass through the valve 38. To open the sliding gate valve 38, the motor 64 is energized to rotate the shaft in the direction to move the block 68 away from the motor 64 to the position shown in broken line. Upon movement of the block 68 from its closed position to its open position, the sliding gate 60 will be pulled by the connecting rod 70 from its closed position occluding the down tube 34 to its open position fully opening the down tube 34. To close the sliding gate valve 38, the motor 64 is rotated in the opposite direction whereupon the block 68 and the sliding gate 60 will return to the positions illustrated in solid line.

The sizes of the storage tank, down tubes, and sliding gate valve are all selected to correspond to the dimensions of the waste collection pit that will be flushed, the schedule of flushing and other constraints imposed or desired by the owner of the facility. Typically, twelve inch diameter PVC sewer pipe is used for the storage tank 30 and holds 5.8 gallons of water per foot. The down tubes 34 are either six inch or eight inch PVC pipe, depending on each application, with the larger pipe being used, of course, for a waste collection pit having larger dimensions. The gate valve will be proportioned to correspond to the diameter of the down tube selected.

The linear actuator 62 used in the preferred embodiment has a linear rate of travel of approximately 100 inches per minute. Accordingly, a six-inch diameter valve would require approximately 3.75 seconds to open whereas an eight-inch valve would require approximately five seconds to open. The total volume of water held in the storage tank 30 will vary upon the particular circumstances of each application. For example, to flush once per day a pit that is approximately 200 feet long and 8 feet wide, an eight-inch down tube 34 would be selected and the storage tank would be of a length to hold approximately 1030 gallons of water (175 feet long, twelve inches in diameter). This system would supply sufficient water to effectively flush the waste collection pit if it is to be cleaned once per day. If, on the other hand, the pit was to be flushed every two hours (12 times per day), less water is required for each flush because the wastes do not have time to accumulate and adhere to the pit. In this application, the storage would be sized to hold approximately 1,000 gallons of water and only a six-inch diameter down tube would be required. The time interval between flushes is selected by the operator according to the availability of water and factors including the desired air quality inside the building, the age or maturity of the animals inside the facility, and how difficult it is to clean the waste collection pits.

The apparatus of the present invention can be used to clean pits of dimensions at least up to 600 feet long by 30 feet wide, with the limiting factor being the size of the reservoir. If a positive slope is desired on the PVC storage tank tube, a certain minimum height differential is required and may not be available in a building of extended length but limited height.

The above described system can be adapted to function effectively with the other housing facilities 10*a, c,* and *d,* illustrated in FIG. 1. In the case of the housing facilities 10*c* and *d,* the storage tank extends longitudinally of the housing facility as above described, but additional transverse distribution pipes are required to feed water to the number of down tubes used to feed the plurality of transverse waste collection pits. In all other respects, the system will function similarly to that described above.

Although the invention has been described with respect to a preferred embodiment thereof, it is to be understood that it is not to be so limited since changes and modifications can be made therein which are within the full intended scope of the invention a defined in the following claims.

I claim:

1. A method of cleaning a waste collection pit of an animal housing facility, comprising the steps of:
   (a) creating a head of water pressure in an overhead reservoir within said facility;
   (b) applying said head of pressure to a gate valve;
   (c) opening said gate valve;
   (d) directing said water from said gate valve to a water distributor to distribute said water across the collection pit; and
   (e) wherein said water flushes the waste from the collection pit.

2. A method of cleaning a waste collection pit of an animal housing facility, comprising the steps of:
   (a) collecting a volume of water in an overhead reservoir within said facility through a down tube open to a gate valve;
   (b) opening said gate valve at selected intervals;
   (c) directing said volume of water through said gate valve to a distributor box; and
   (d) flushing the waste from the collection pit with said volume distributed across the collection pit of water from said distributor box.

3. Apparatus for cleaning a sloping waste collection pit of an animal housing facility, comprising:
   (a) an overhead reservoir within said facility containing a volume of water;
   (b) a distribution box at the higher end of the collection pit;
   (c) conduit means interconnecting said reservoir and said distribution box; and
   (d) a gate valve interposed in said conduit means for selectively releasing said volume of water to said distribution box for flushing the waste from the collection pit.

* * * * *